US012630106B1

(12) United States Patent
Del Aguila et al.

(10) Patent No.: US 12,630,106 B1
(45) Date of Patent: May 19, 2026

(54) DEPLOYABLE HALO FOR OPEN-AIR VEHICLE

(71) Applicant: Ford Global Technologies, LLC, Deborn, MI (US)

(72) Inventors: Luis Rodrigo Del Aguila, Lomas de Valle Dorado (MX); Asahel Mendoza, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/199,590

(22) Filed: May 6, 2025

(51) Int. Cl.
B60R 21/13 (2006.01)
(52) U.S. Cl.
CPC ........ B60R 21/13 (2013.01); B60R 2021/135 (2013.01)
(58) Field of Classification Search
CPC ....... B60R 21/13; B60R 2021/135; B60J 1/20
USPC ................................ 280/756; 296/95.1, 97.1
See application file for complete search history.

(56) References Cited

U.S. PATENT DOCUMENTS

| | | | | |
|---|---|---|---|---|
| 6,415,883 | B1 * | 7/2002 | Myrholt ................. | B62D 25/04 |
| | | | | 296/187.05 |
| 6,425,623 | B2 * | 7/2002 | Nakayama ............ | B60J 11/025 |
| | | | | 296/98 |
| 6,817,626 | B2 | 11/2004 | Boll et al. | |
| 7,140,663 | B1 * | 11/2006 | Thacker .................... | B60J 3/02 |
| | | | | 160/DIG. 3 |
| 7,172,233 | B2 * | 2/2007 | Walker ...................... | B60J 1/20 |
| | | | | 160/370.21 |
| 7,494,178 | B2 | 2/2009 | Nygaard | |
| 9,283,472 | B2 | 3/2016 | Platzer | |
| 9,365,094 | B2 | 6/2016 | Salamon | |
| 9,452,667 | B2 * | 9/2016 | Harmon ................... | B64D 1/22 |
| 10,737,647 | B2 | 8/2020 | Oliver et al. | |
| 11,279,210 | B2 * | 3/2022 | Kim ....................... | G02B 5/003 |
| 11,345,272 | B1 * | 5/2022 | Tatro ....................... | B60P 3/343 |
| 11,845,406 | B2 * | 12/2023 | Svengalis ................ | B60S 3/04 |
| 2002/0043417 | A1 * | 4/2002 | Ishizaki .................. | B60R 21/38 |
| | | | | 180/274 |

(Continued)

FOREIGN PATENT DOCUMENTS

| | | |
|---|---|---|
| DE | 2033733 B2 | 2/1976 |
| DE | 10314423 B3 | 9/2004 |

(Continued)

*Primary Examiner* — Toan C To
(74) *Attorney, Agent, or Firm* — Frank A. MacKenzie; Brooks Kushman P.C.

(57) ABSTRACT

A protection system for an open-air vehicle includes a left track, a right track, a front carrier, and a front plate. The tracks are fixed relative to a frame longitudinally forward of a cabin of the open-air vehicle. The tracks are elongated longitudinally and parallel. The front carrier is engaged with the tracks. The front carrier is slidable along the tracks between a front position and a rear position. The front plate is rotatable about the front carrier at a lower edge of the front plate. The front plate is movable with the front carrier between an undeployed position when the front carrier is in the front position and a deployed position when the front carrier is in the rear position. The front plate in the undeployed position is more horizontal and in the deployed position slopes upward from the front carrier in front of the cabin.

20 Claims, 12 Drawing Sheets

(56)         References Cited

U.S. PATENT DOCUMENTS

2004/0182629 A1 *   9/2004   Takahashi ........... B60R 21/0132
                                                    180/274
2004/0262893 A1 *  12/2004   Kempf ................... B60R 21/34
                                                    180/274
2004/0262894 A1 *  12/2004   Kempf ................... B60R 21/36
                                                    180/274
2006/0042854 A1 *   3/2006   Sasaki .................... B60R 21/36
                                                    180/274
2006/0201731 A1 *   9/2006   Nakamura ............. B60R 21/36
                                                    180/274
2006/0255580 A1    11/2006   Enders et al.
2020/0269791 A1     8/2020   Rhoden
2020/0331424 A1 *  10/2020   Cord ....................... B60R 21/36
2022/0024395 A1     1/2022   Balcombe

FOREIGN PATENT DOCUMENTS

DE         102005004809 B3    6/2006
EP             3792893 A1    3/2021

* cited by examiner

DEPLOYABLE HALO FOR OPEN-AIR VEHICLE

BACKGROUND

In motor racing, a halo is a protection system that includes a curved bar above a driver's head. The Federation Internationale de l'Automobile (FIA) has required a halo for vehicles racing in the Formula 1 series and other racing series since 2018. A similar design has been used for the Indycar series, which includes a frontal windshield.

DETAILED DESCRIPTION

Figure 1A:
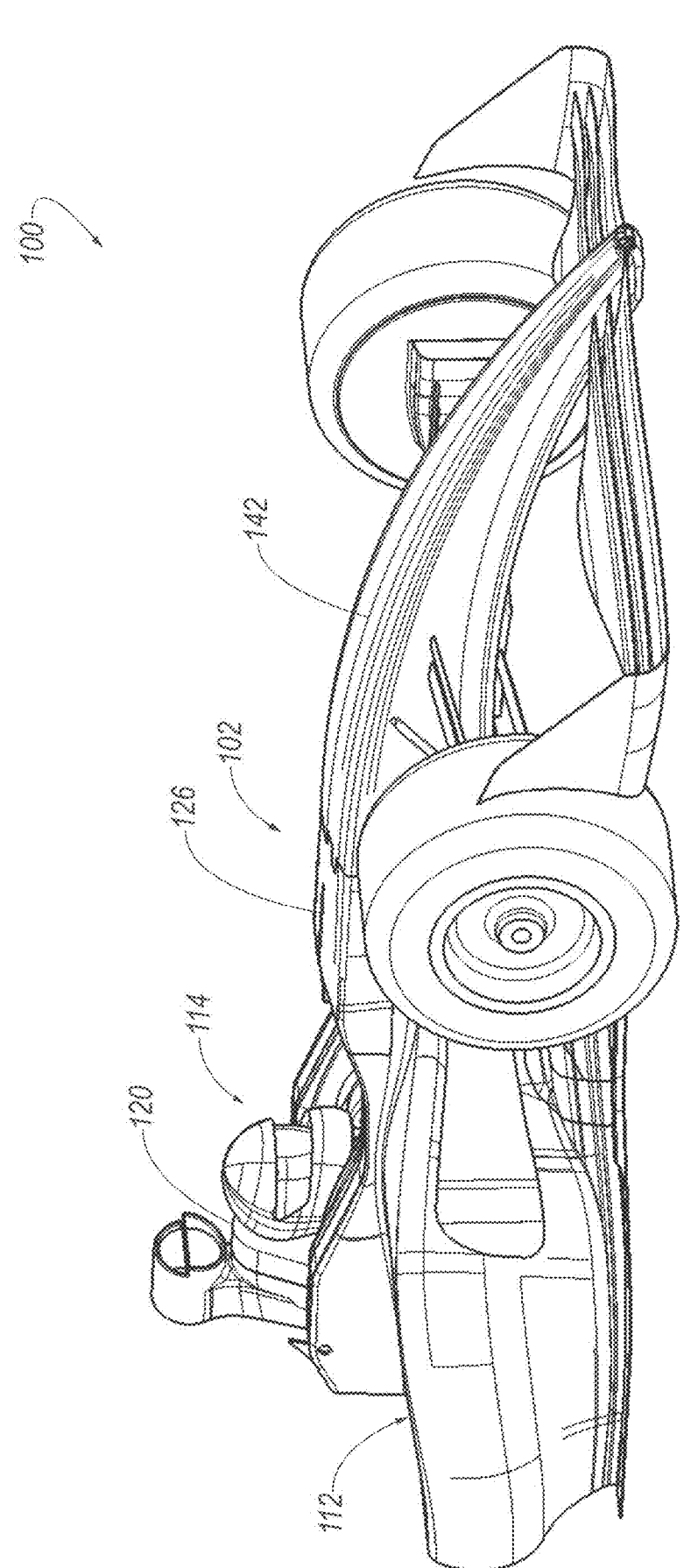
FIG. 1A is a perspective view of an example open-air vehicle with an example protection system in an undeployed configuration.

This disclosure pertains to a protection system for an open-air vehicle such as a Formula 1 or Indycar racecar. The protection system can provide structural protection around a professional driver of the open-air vehicle. The protection system includes a left track, a right track, a front carrier, and a front plate. The left track is fixed relative to a frame of the open-air vehicle. The left track is positioned longitudinally forward of a cabin of the open-air vehicle. The left track is elongated longitudinally relative to the open-air vehicle. The right track is fixed relative to the frame. The right track is positioned longitudinally forward of the cabin. The right track is parallel to the left track. The front carrier is engaged with the left track and the right track. The front carrier is slidable along the left track and the right track between a front position and a rear position. The front position is forward of the rear position. The front plate extends from a lower edge to an upper edge. The front plate is rotatable about the front carrier at the lower edge (e.g., about a pin of the front carrier). The front plate is movable with the front carrier between an undeployed position and a deployed position. The front plate is in the undeployed position when the front carrier is in the front position. The front plate is in the deployed position when the front carrier is in the rear position. The front plate in the deployed position slopes upward from the front carrier in front of the cabin. The front plate in the undeployed position is more horizontal than in the deployed position.

The protection system can provide good visibility to the driver during normal operation while also helping block road debris when deployed. The front plate in the undeployed position may be concealed by a hood of the open-air vehicle, providing a full range of front visibility to the driver. The front plate (and possibly the hood) in the deployed position may block debris from the racetrack that could have entered the cabin. The protection system may further include a deployable top assembly, as described herein. Deployment may be triggered by environmental sensors of the open-air vehicle detecting the debris, by the driver within the open-air vehicle spotting the debris, or remotely by a technician or automated system for the racetrack at which the open-air vehicle is racing when debris is spotted on the racetrack. The cabin of the open-air vehicle may include a screen that displays image data from a forward-facing camera of the open-air vehicle, to maintain visibility for the driver when the protection system is deployed. The protection system may be retractable by the driver (or remotely by the team) into the undeployed position, thereby permitting the driver to more easily exit the open-air vehicle.

A protection system for an open-air vehicle includes a left track fixed relative to a frame of the open-air vehicle, the left track positioned longitudinally forward of a cabin of the open-air vehicle, the left track elongated longitudinally relative to the open-air vehicle; a right track fixed relative to the frame, the right track positioned longitudinally forward of the cabin, the right track parallel to the left track; a front carrier engaged with the left track and the right track, the front carrier slidable along the left track and the right track between a front position and a rear position, the front position being forward of the rear position; and a front plate extending from a lower edge to an upper edge. The front plate is rotatable about the front carrier at the lower edge. The front plate is movable with the front carrier between an undeployed position and a deployed position. The front plate is in the undeployed position when the front carrier is in the front position. The front plate is in the deployed position when the front carrier is in the rear position. The front plate in the deployed position slopes upward from the front carrier in front of the cabin. The front plate in the undeployed position is more horizontal than in the deployed position.

In an example, the protection system may further include a U-member hingedly connected to the front plate at the upper edge, the U-member including a left arm elongated rearward from the front plate along a left side of the cabin, and the U-member including a right arm elongated rearward from the front plate along a right side of the cabin. In a further example, the protection system may further include a left linkage bar and a right linkage bar, the left linkage bar elongated from a first end to a second end, the first end of the left linkage bar hingedly connected to an end of the left arm of the U-member, the second end of the left linkage bar hingedly connected to the frame of the open-air vehicle longitudinally behind the cabin, the right linkage bar elongated from a first end to a second end, the first end of the right linkage bar hingedly connected to an end of the right arm of the U-member, and the second end of the right linkage bar hingedly connected to the frame of the open-air vehicle longitudinally behind the cabin. In a still further example, the protection system may further include a magnetic extension fixed relative to one of the left linkage bar or right linkage bar, the magnetic extension positioned to magnetically attach to the frame of the open-air vehicle when the front plate is in the deployed position.

In an example, the protection system may further include a hood fixed to the front plate, and the hood may be positioned to conceal the front plate when the front plate is in the undeployed position.

In an example, the protection system may further include a cable elongated from a first end to a second end, the first end may be accessible in the cabin, the second end may be attached to the front carrier, and when the cable is in tension, the second end of the cable may exert a force pulling the front carrier toward the front position.

In an example, the protection system may further include a top assembly mounted to the front plate, the top assembly configured to expand from a retracted configuration to an extended configuration in response to the front plate moving from the undeployed position to the deployed position. In a further example, the top assembly may include a top carrier, the front plate may include front-plate tracks, and the top carrier may be slidable in the front-plate tracks from a retracted position on the front plate to an extended position extending from the front plate. In a still further example, the top carrier may include an upper section and a lower section; the upper section and the lower section may be hingedly connected; when the top carrier is in the retracted position, the upper section and the lower section may be in the front-plate tracks; and when the top carrier is in the extended position, the lower section may be in the front-plate tracks, and the upper section may be spaced from the front plate. In a yet still further example, the protection system may further include a top-carrier spring connecting the upper section and the lower section, and the top-carrier spring may be arranged to bias the upper section downward from being parallel to the front plate.

In another still further example, the top assembly may include a top plate, the top carrier may include top-carrier tracks, and the top plate may be slidable in the top-carrier tracks from a retracted position on the top carrier to an extended position extending from the top carrier. In a yet still further example, the top plate may be a first top plate, and the top assembly may include a second top plate slidable relative to the first top plate from a retracted position on the first top plate to an extended position extending from the first top plate.

In another yet still further example, the top plate may be a first top plate, the top assembly may include a plurality of top plates including the first top plate, the top plates may be extendable from a retracted configuration to an extended configuration, the top plates in the retracted configuration may be stacked, and in the extended configuration, the first top plate extends from the top carrier, and each top plate extends from a previous one of the top plates. In a continuing example, the top plates in the extended configuration may be attached to the frame of the open-air vehicle behind the cabin.

In another yet still further example, the top assembly may include a shield plate rotatable relative to the top plate from an inboard position on the top plate to an outboard position extending from the top plate, the top assembly may include a shield-plate spring connecting the top plate and the shield plate, and the shield-plate spring may be arranged to bias the shield plate toward the outboard position. In a continuing example, the shield plate may be a first shield plate, the first shield plate in the outboard position may extend leftward from the top plate, the top assembly may include a second shield plate rotatable relative to the top plate from an inboard position on the top plate to an outboard position extending from the top plate, and the second shield plate in the outboard position may extend rightward from the top plate.

In another still further example, the protection system may further include a cable elongated from a first end to a second end, the first end may be accessible in the cabin, the second end may be attached to the top carrier, and when the cable is in tension, the second end of the cable may exert a force pulling the top carrier to the retracted position.

In another further example, the protection system may further include a hood fixed to the front plate, and the hood may be positioned to conceal the front plate and the top assembly when the front plate is in the undeployed position and the top assembly is in the retracted configuration.

In an example, the protection system may further include a rotary actuator and a belt positioned to be driven by the rotary actuator, and the front carrier may be fixed to the belt.

A protection system for an open-air vehicle includes a front plate extending from a lower edge to an upper edge, the front plate movable relative to a frame of the open-air vehicle between an undeployed position and a deployed position, the front plate in the deployed position sloping upward from the lower edge in front of a cabin of the open-air vehicle, the front plate in the undeployed position being more horizontal than in the deployed position; and a top assembly mounted to the front plate, the top assembly configured to expand from a retracted configuration to an extended configuration in response to the front plate moving from the undeployed position to the deployed position.

With reference to the Figures, wherein like numerals indicate like parts throughout the several views, a protection system 102 for an open-air vehicle 100 includes a left track 104, a right track 106, a front carrier 108, and a front plate 110. The left track 104 is fixed relative to a frame 112 of the open-air vehicle 100. The left track 104 is positioned longitudinally forward of a cabin 114 of the open-air vehicle 100. The left track 104 is elongated longitudinally relative to the open-air vehicle 100. The right track 106 is fixed relative to the frame 112. The right track 106 is positioned longitudinally forward of the cabin 114. The right track 106 is parallel to the left track 104. The front carrier 108 is engaged with the left track 104 and the right track 106. The front carrier 108 is slidable along the left track 104 and the right track 106 between a front position and a rear position. The front position is forward of the rear position. The front plate 110 extends from a lower edge 116 to an upper edge 118. The front plate 110 is rotatable about the front carrier 108 at the lower edge 116. The front plate 110 is movable with the front carrier 108 between an undeployed position and a deployed position. The front plate 110 is in the undeployed position when the front carrier 108 is in the front position. The front plate 110 is in the deployed position when the front carrier 108 is in the rear position. The front plate 110 in the deployed position slopes upward from the front carrier 108 in front of the cabin 114. The front plate 110 in the undeployed position is more horizontal than in the deployed position.

With reference to FIG. 1A, the open-air vehicle 100 is a passenger automobile. For the purposes of this disclosure, "open-air" when used as a modifier is defined as having the cabin 114 exposed (e.g., lacking a permanent structure above the driver's head). For example, the open-air vehicle 100 may be a race car as used in racing series such as Formula 1 and Indycar.

The open-air vehicle 100 includes the frame 112. The open-air vehicle 100 may use a monocoque design, in which the frame 112 is a single integrated structure that also serves as the body of the open-air vehicle 100.

The open-air vehicle 100 includes the cabin 114 to house occupant(s) of the open-air vehicle 100. The cabin 114 may include a single seat 120 for the driver. The cabin 114 may be defined by the frame 112. The cabin 114 may have an open top, and the seat 120 may be positioned such that a head of the driver extends upward from the cabin 114.

Terms such as "front," "forward," "longitudinal," "back," "rearward," "left," "right," "lateral," "upward," "downward," "horizontal," "vertical," etc., are understood relative to the open-air vehicle 100.

Figure 1B:
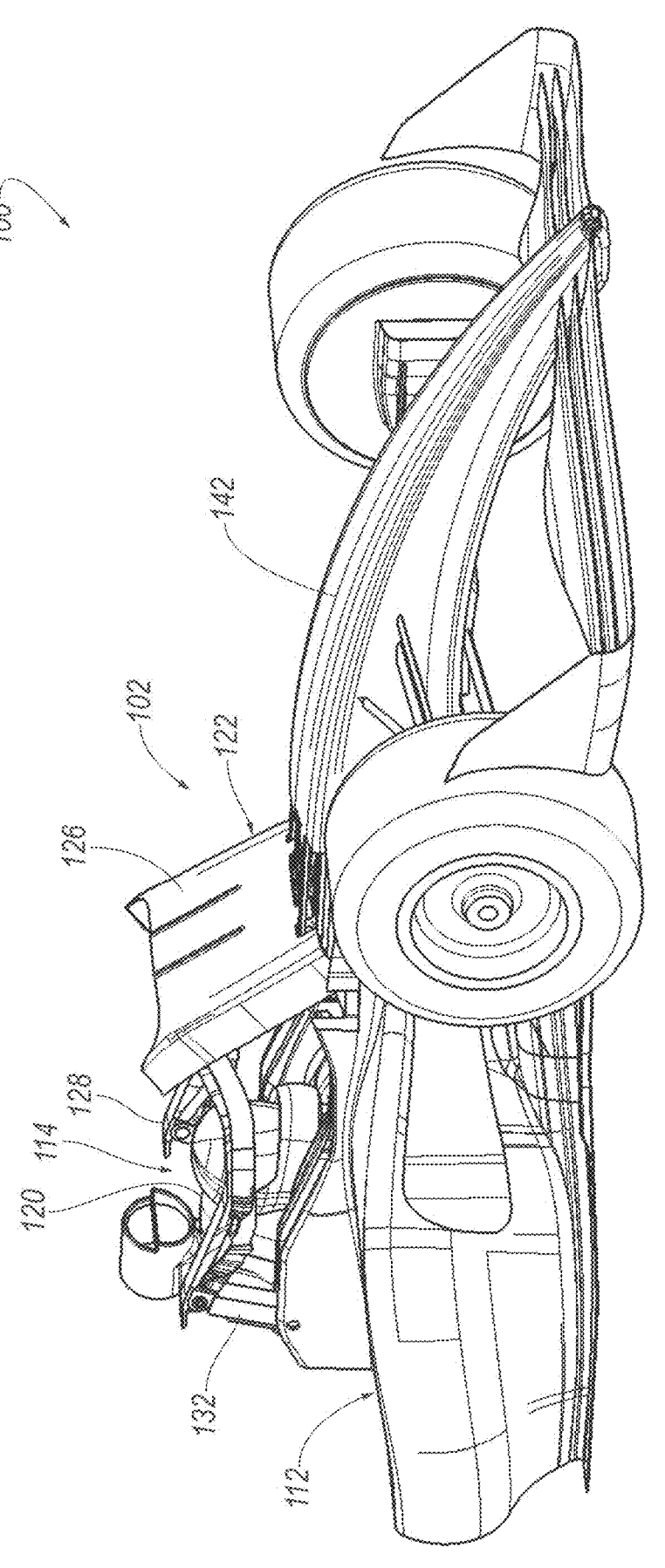
FIG. 1B is a perspective view of the open-air vehicle with a front-protection system of the protection system in a deployed configuration.
Figure 2A:
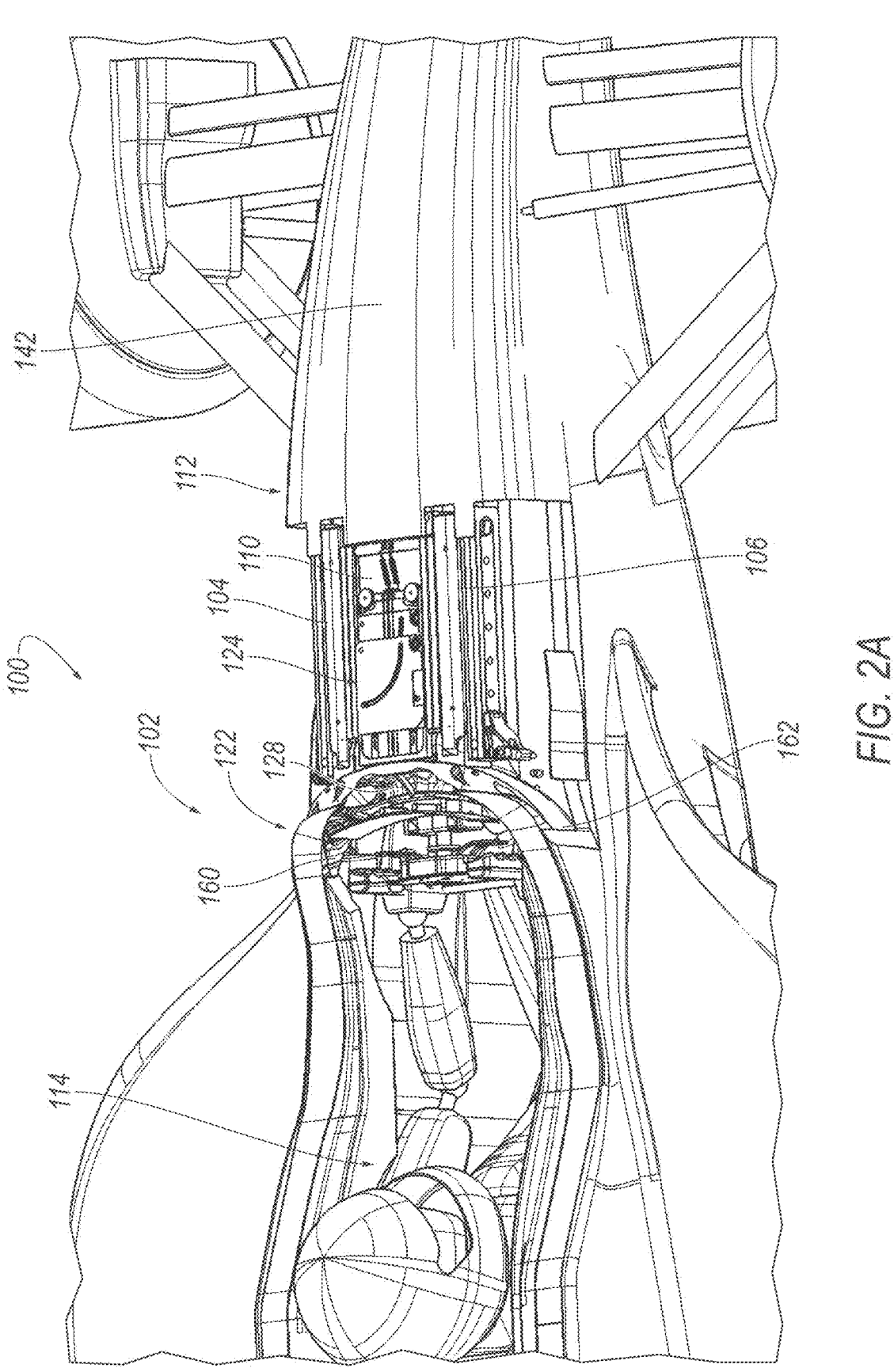
FIG. 2A is a perspective view of the front-protection system in an undeployed configuration with a hood removed for illustration.
Figure 2B:
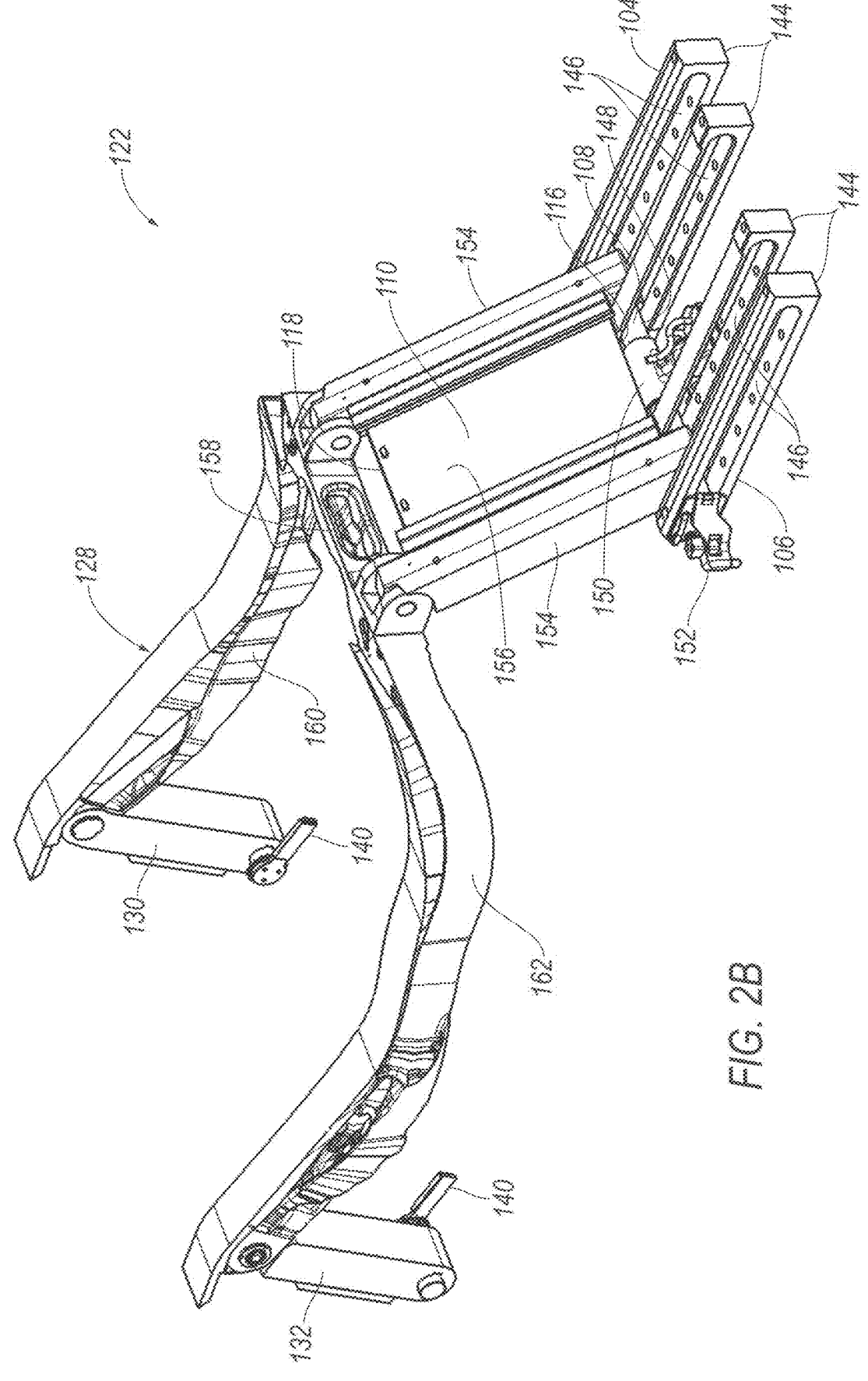
FIG. 2B is a perspective view of the front-protection system in a deployed configuration with the hood removed for illustration.

With reference to FIGS. 1A-B and 4A-B, as a general overview, the protection system 102 includes a front-protection assembly 122 and a top assembly 124. The front-protection assembly 122 is expandable from a retracted configuration as shown in FIG. 1A to an extended configuration as shown in FIG. 1B. The front-protection assembly 122 includes, among other components, the front plate 110. The front plate 110 is in the undeployed position when the front-protection assembly 122 is in the retracted configuration, as shown in FIG. 2A, and the front plate 110 is in the deployed position when the front-protection assembly 122 is in the expanded configuration, as shown in FIG. 2B. The top assembly 124 is configured to expand from a retracted configuration to an extended configuration in response to the front-protection assembly 122 expanding from the retracted configuration to the expanded configuration (i.e., in response to the front plate 110 moving from the undeployed position to the deployed position). The expansion of the top assembly 124 may overlap the expansion of the front-protection system. For example, the front-protection assembly 122 may begin to transition from the retracted configuration to the expanded configuration, which triggers the top assembly 124 to begin to transition. The top assembly 124 may begin transitioning from the retracted configuration to the expanded configuration before the front-protection assembly 122 fully moves to the expanded configuration.

With reference to FIGS. 2A-B, as a general overview, the front-protection assembly 122 may include the left track 104, the right track 106, the front carrier 108, the front plate 110, a hood 126, a U-member 128, a left linkage bar 130, a right linkage bar 132, a rotary actuator 134, a belt 136, a drive mechanism 138, and magnetic extensions 140. When the front-protection assembly 122 is in the retracted configuration, the front carrier 108 is in the front position, the front plate 110 and the hood 126 are in the undeployed position, and the U-member 128 and the linkage bars 130, 132 are in down positions. When the front-protection assembly 122 is in the expanded configuration, the front carrier 108 is in the rear position, the front plate 110 and the hood 126 are in the deployed position, and the U-member 128 and the linkage bars 130, 132 are in up positions. To move the front-protection assembly 122 from the retracted configuration to the expanded configuration, the rotary actuator 134 drives the belt 136 and/or the drive mechanism 138. The belt 136 pulls the front carrier 108 in the tracks 104, 106 from the front position to the rear position, thereby pushing the front plate 110 from the undeployed position to the deployed position (in coordination with the movement of the U-member 128 from the down position to the up position). The drive mechanism 138 rotates the linkage bars 130, 132 to the up position. The movement of the linkage bars 130, 132 and the front plate 110 raises the U-member 128 to the up position.

The left track 104 and right track 106 are fixed relative to the frame 112. For example, the tracks 104, 106 may be fastened to the frame 112. The left track 104 and right track 106 are positioned longitudinally forward of the cabin 114 of the open-air vehicle 100 (e.g., on a top of an internal, flat surface of a front end 142 of the open-air vehicle 100). The left track 104 and the right track 106 are elongated longitudinally relative to the open-air vehicle 100. The right track 106 is parallel to the left track 104 (and vice versa). The left track 104 and the right track 106 may be symmetrical to each other across a longitudinal midplane of the open-air vehicle 100. The longitudinal midplane extends along the longitudinal (fore-aft) axis and along the vertical (up-down) axis of the open-air vehicle 100.

The tracks 104, 106 may be shaped to permit the front carrier 108 to slide between the front position and the rear position and to stop the front carrier 108 from sliding forward beyond the front position and rearward beyond the rear position. For example, the left track 104 and right track 106 may each include one or two track members 144 with track slots 146 extending therethrough. The track slots 146 may be shaped to receive a pin 148 of the front carrier 108. The track slots 146 may be elongated from the front position to the rear position and terminate at the front position and the rear position. The track slots 146 may have a width matching a diameter of the pin 148.

The front carrier 108 may include a central bracket 150 and the pin 148. The central bracket 150 is positioned between the left track 104 and the right track 106. The pin 148 may have a cylindrical shape defining an axis elongated laterally relative to the open-air vehicle 100. The pin 148 may extend through the central bracket 150. The central bracket 150 may be shaped to maintain a same orientation when sliding between the front position and the rear position.

The front carrier 108 is engaged with the left track 104 and the right track 106. The front carrier 108 is slidable along the left track 104 and the right track 106 between the front position and the rear position. The front position is forward of the rear position. The rear position may be closest to the cabin 114, and the front position may be farthest from the cabin 114. For example, the pin 148 may extend through the track slots 146 of the left and right tracks 104, 106. The tracks 104, 106 may include track snaps 152 configured to hold the front carrier 108 (e.g., the pin 148) once the front carrier 108 moves to the rear position.

The front plate 110 may include two front-plate beams 154 and a front-plate plate 156. The front-plate beams 154 are elongated parallel to each other longitudinally and possibly (depending on the position of the front plate 110) vertically relative to the open-air vehicle 100. The front-plate plate 156 extends from one of the front-plate beams 154 to the other of the front-plate beams 154. The front-plate plate 156 and the front-plate beams 154 are fixed together. For example, the front-plate beams 154 may be welded to the front-plate plate 156, or the front-plate beams 154 may be integral with the front-plate plate 156 (i.e., made of a single, uniform piece of material with no seams, joints, fasteners, or adhesives holding it together). The front plate 110 extends from the lower edge 116 to the upper edge 118. The front-plate plate 156 and the front-plate beams 154 may extend from the lower edge 116 to the upper edge 118. The front-plate plate 156 and the front-plate beams 154 may align at the upper edge 118. The front-plate beams 154 may extend beyond the front-plate plate 156 at the lower edge 116 in order to connect to the pin 148 of the front carrier 108.

The front plate 110 is rotatable about the front carrier 108 at the lower edge 116 of the front plate 110. For example, the front-plate beams 154 may define circular bores through which the pin 148 of the front carrier 108 extends. The front plate 110 may be rotatable about the axis defined by the cylindrical shape of the pin 148. The portions of the front-plate beams 154 having the bores may be positioned between the track members 144 of the each of the tracks 104, 106.

The front plate 110 is movable with the front carrier 108 between the undeployed position and the deployed position. The front plate 110 is in the undeployed position when the front carrier 108 is in the front position, as shown in FIG. 2A. The front plate 110 in the undeployed position is more horizontal than in the deployed position (e.g., is fully horizontal). The front plate 110 is in the deployed position when the front carrier 108 is in the rear position, as shown in FIG. 2B. Because of the connection between the upper edge 118 of the front plate 110 and the U-member 128, when the front carrier 108 pushes the lower edge 116 of the front plate 110 rearward, the upper edge 118 of the front plate 110 moves upward rather than solely rearward. The front plate 110 in the deployed position slopes upward from the front carrier 108 in front of the cabin 114.

Returning to FIGS. 1A-B, the hood 126 is fixed to the front plate 110. The hood 126 is positioned to conceal the front plate 110 when the front plate 110 is in the undeployed position (as well as conceal the top assembly 124 when the top assembly 124 is in the retracted configuration). The hood 126 moves together with the front plate 110 as the front plate 110 moves between the deployed position and the undeployed position. The hood 126 may be curved as part of an aerodynamic shape of the front end 142 of the open-air vehicle 100. When the hood 126 and the front plate 110 are in the undeployed position, the hood 126 may form a smooth exterior surface of the open-air vehicle 100 with the rest of the front end 142. The hood 126 may define an opening at the upper edge 118 of the front plate 110, through which the top assembly 124 is able to expand, as described below.

Returning to FIG. 2B, the U-member 128 is generally U-shaped. The U-member 128 includes a central member 158 elongated laterally relative to the open-air vehicle 100, a left arm 160 elongated rearward from the central member 158, and a right arm 162 elongated rearward from the central member 158. The central member 158 may be centered on a longitudinal midplane of the open-air vehicle 100. The U-member 128 may be symmetrical to itself across the longitudinal midplane. A left half of the central member 158 may be symmetrical to a right half of the central member 158 across the longitudinal midplane, and the left arm 160 may be symmetrical with the right arm 162 across the longitudinal midplane. The left arm 160 may be elongated along a left side of the cabin 114, and the right arm 162 may be elongated along a right side of the cabin 114. The left arm 160 and the right arm 162 may be elongated outboard as well as rearward from the central member 158. With this shape, the U-member 128 extends in front of the driver and along the sides of the driver from in front of the driver to behind the driver. When the U-member 128 is in the down position, the U-member 128 may surround the driver such that the left arm 160 is near the left side of the driver and the right arm 162 is near the right side of the driver. When the U-member 128 is in the up position, the U-member 128 may be positioned at least partially above the driver's head.

The U-member 128 (e.g., the central member 158) is hingedly connected to the front plate 110 at the upper edge 118 of the front plate 110. The left arm 160 and the right arm 162 are thus elongated rearward from the front plate 110. The U-member 128 and the front plate 110 are rotatable relative to each other about a horizontal, lateral axis defined by the hinged connection. The U-member 128 is hingedly connected to the left linkage bar 130 at an end of the left arm 160, and the U-member 128 is hingedly connected to the right linkage bar 132 at an end of the right arm 162. The U-member 128 and each of the linkage bars 130, 132 are rotatable relative to each other about a horizontal, lateral axis defined by the respective hinged connection.

The left linkage bar 130 is symmetrical with the right linkage bar 132 across the longitudinal midplane of the open-air vehicle 100. Each linkage bar 130, 132 is elongated from a first end to a second end. The first end of each linkage bar 130, 132 is hingedly connected to the end of the respective one of the left arm 160 and the right arm 162 of the U-member 128. The second end of each linkage bar 130, 132 is hingedly connected to the frame 112 longitudinally behind the cabin 114. The linkage bars 130, 132 may be significantly shorter than the arms 160, 162 of the U-member 128.

Figure 3:
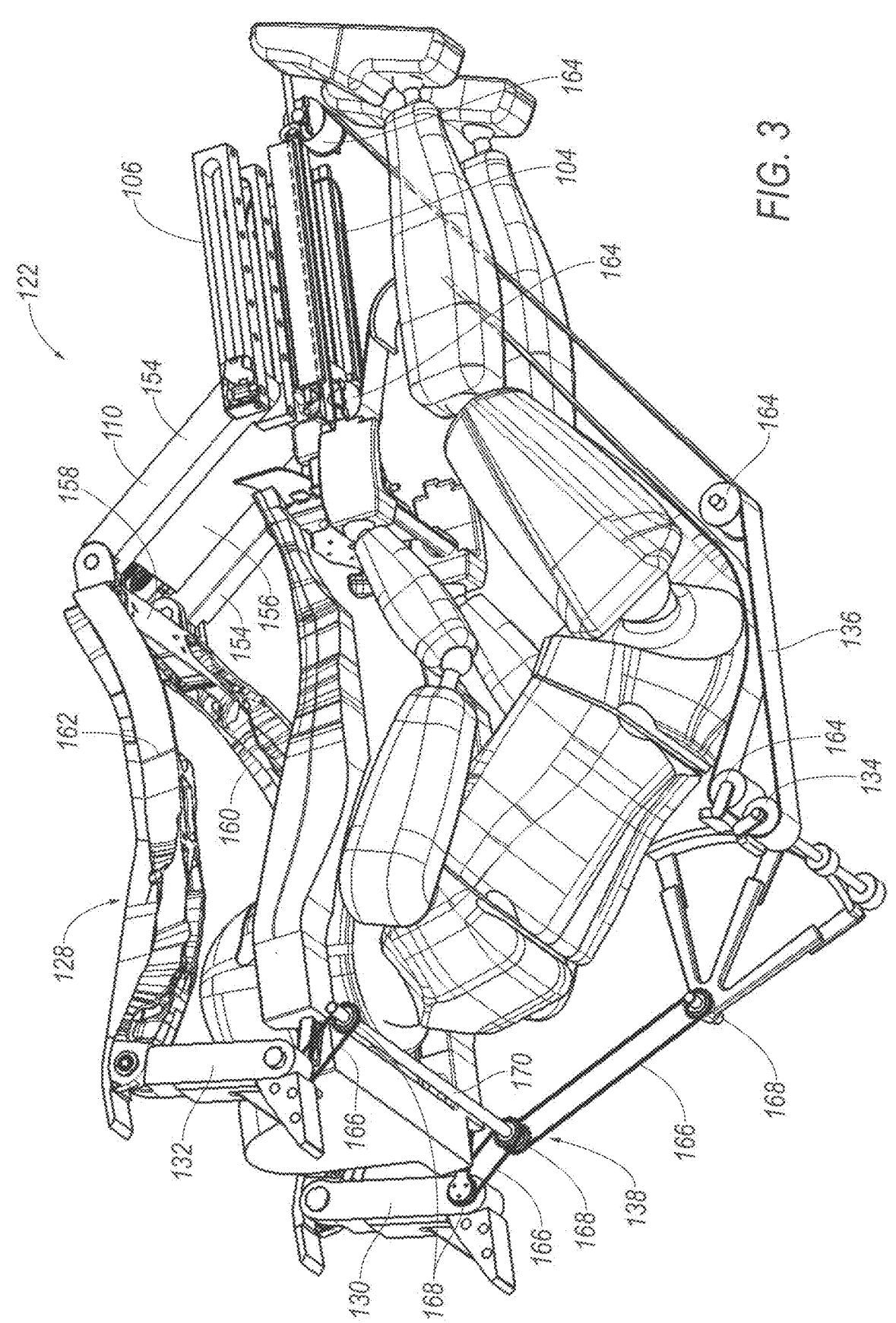
FIG. 3 is a bottom perspective view of the front-protection system with the hood removed for illustration.

With reference to FIG. 3, the rotary actuator 134 is positioned to drive the belt 136 and/or the drive mechanism 138. For example, the rotary actuator 134 may be positioned underneath and/or behind the driver and the seat 120. The rotary actuator 134 may be any suitable actuator for generating rotational kinetic energy (e.g., an electric motor converting electrical energy to rotational kinetic energy or a pyrotechnic actuator using a chemical reaction to drive rotational kinetic energy). The rotary actuator 134 imparts rotational motion to the belt 136 and/or to the drive mechanism 138.

The belt 136 is positioned to be driven by the rotary actuator 134 and to drive the front carrier 108. The belt 136 may be stretched around an output shaft of the rotary actuator 134 in order to be driven by the rotary actuator 134. Rotational motion of the output shaft imparts translational motion to the belt 136. The belt 136 may be threaded through the open-air vehicle 100 from the rotary actuator 134 to the tracks 104, 106. The belt 136 may be held in place by a plurality of pulleys 164 mounted to the frame 112 of the open-air vehicle 100. The front carrier 108 may be fixed to the belt 136. A portion of the belt 136 may be stretched below the tracks 104, 106, and translational motion of this portion of the belt 136 moves the front carrier 108 between the front position and the rear position.

The drive mechanism 138 is positioned to be driven by the rotary actuator 134 and to drive the linkage bars 130, 132. For example, the drive mechanism 138 may include one or more chains 166, sprockets 168, and transmission rods 170. Each chain 166 may be engaged with two sprockets 168 and may transfer rotational motion from one sprocket 168 to the other sprocket 168 in a direction perpendicular to the axes of rotation of the sprockets 168. Each transmission rod 170 may be fixed to two or more sprockets 168 and may transfer rotational motion from one sprocket 168 to the other sprocket(s) 168 along a common axis of rotation of the sprockets 168 and the transmission rod 170. The drive mechanism 138 converts the rotational output of the rotary actuator 134 to rotation of the linkage bars 130, 132 at the second ends of the linkage bars 130, 132.

Returning to FIG. 2B, a magnetic extension 140 is fixed relative to one or each of the left linkage bar 130 and the right linkage bar 132. Each magnetic extension 140 is positioned to magnetically attach to the frame 112 of the open-air vehicle 100 when the front-protection assembly 122 is in the expanded configuration (i.e., when the front plate 110 is in the deployed position, and the respective linkage bar 130, 132 is in the up position). Each magnetic extension 140 may be cantilevered from the respective linkage bar 130, 132, and each magnetic extension 140 may include a magnet at the free end defined by the cantilevered shape. The magnet may be an electromagnet or a permanent magnet. When the linkage bar 130, 132 is in the down position, the magnet may be spaced from the frame 112 (or, for an electromagnet, deenergized). When the linkage bar 130, 132 is in the up position, the magnet may be positioned to magnetically attach to the frame 112, thereby helping hold the front-protection assembly 122 in the expanded position (possibly in combination with the track snaps 152 holding the pin 148).

Figure 4A:
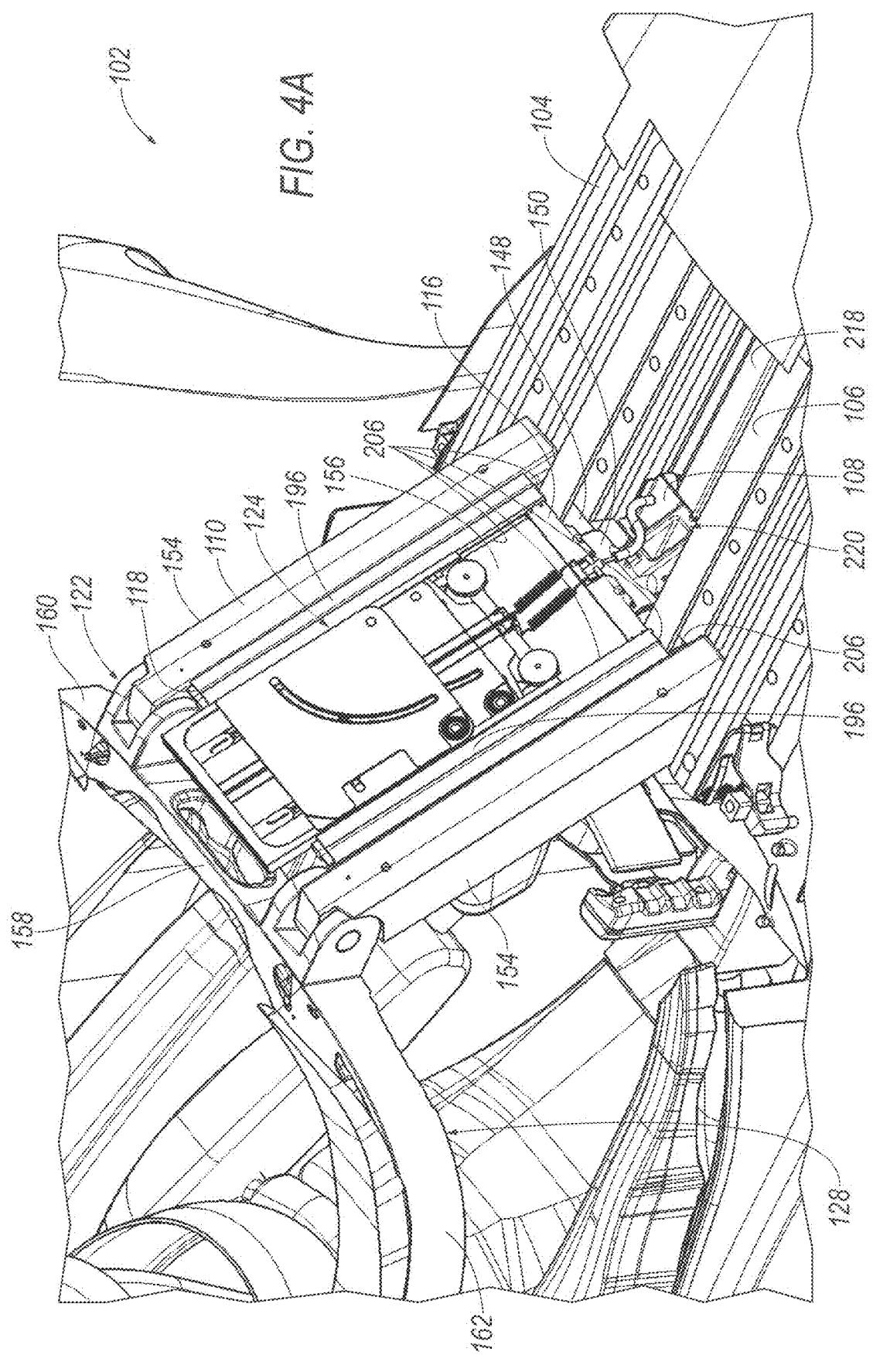
FIG. 4A is a perspective view of a top assembly of the protection system on the open-air vehicle in a retracted configuration.
Figure 4B:
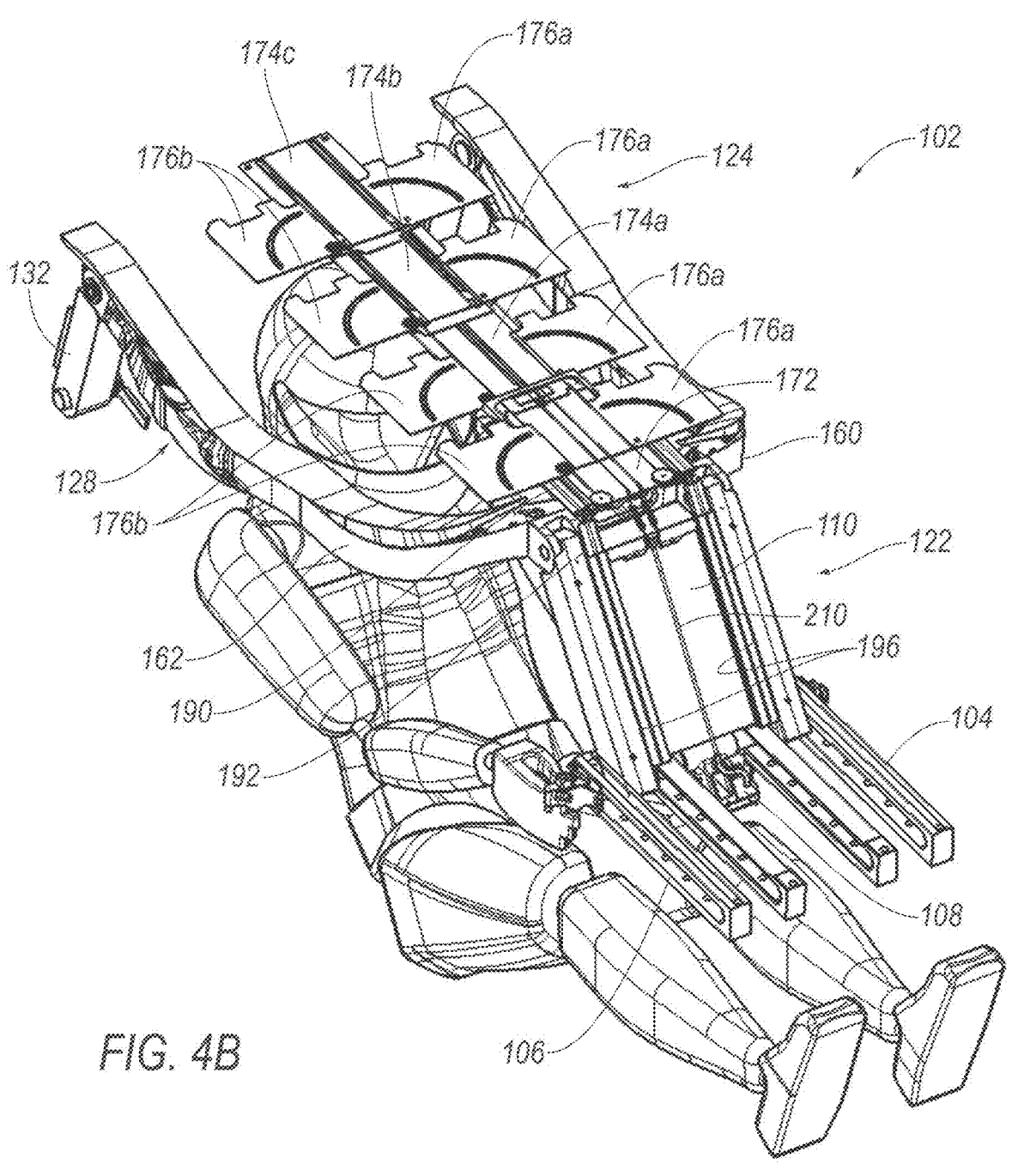
FIG. 4B is a perspective view of the top assembly on the open-air vehicle in an expanded configuration.

With reference to FIGS. 4A-B, as a general overview, the top assembly 124 includes a top carrier 172, a plurality of top plates 174, a plurality of shield plates 176, spools 178, spool wires 180, retraction springs 182, retraction wires 184, and shield-plate springs 186. When the top assembly 124 is in the retracted configuration, the top carrier 172 is in a retracted position on the front plate 110, the top plates 174 are in retracted positions stacked on the top carrier 172, and the shield plates 176 are in inboard positions on respective top plates 174 (as shown in FIG. 4A). When the top assembly 124 is in the extended configuration, the top carrier 172 is in an extended position extending from the front plate 110, the top plates 174 are in extended positions extending from the top carrier 172 or respective top plate 174, and the shield plates 176 are in outboard positions extending left or right from the respective top plates 174 (as shown in FIG. 4B).

Continuing the general overview, to move the top assembly 124 from the retracted configuration to the extended configuration, a top-carrier driver 188 of the top carrier 172 is activated in response to the front-protection assembly 122 beginning to move from the retracted configuration to the expanded configuration. The top-carrier driver 188 moves the top carrier 172 along the front plate 110 from the retracted position to the extended position. This movement unspools the spool wires 180 from the spools 178. Ends of spool wires 180 are connected to an uppermost one of the top plates 174, so the unspooling permits movement of the top plates 174 relative to the top carrier 172 and each other. The retraction springs 182 pull respective retraction wires 184 in, thereby pulling the top plates 174 to the extended positions. The movement of the top plates 174 carries the shield plates 176 outside of edges of the top carrier 172, permitting the shield-plate springs 186 to rotate the shield plates 176 from the inboard positions to the outboard positions.

Figure 5:
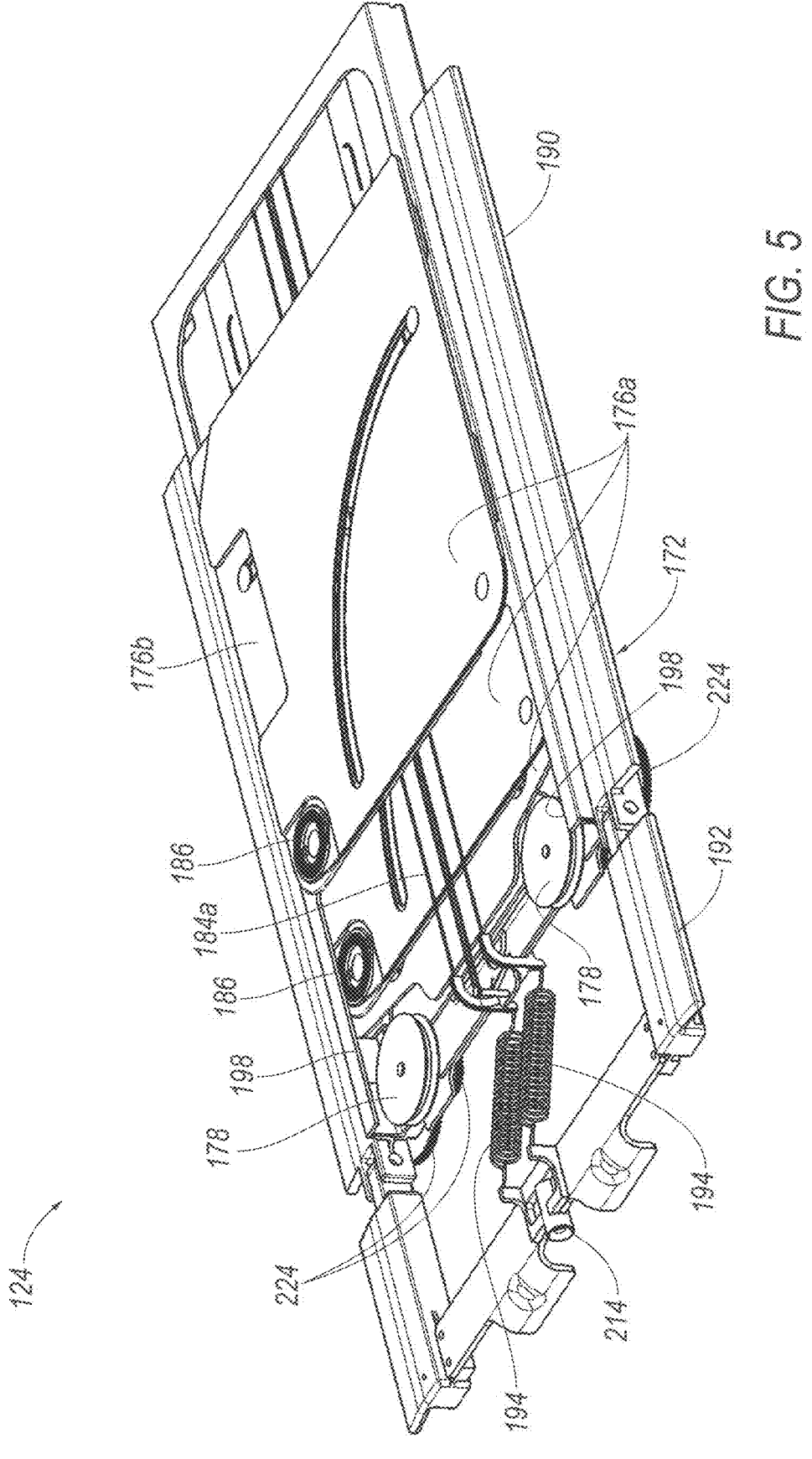
FIG. 5 is a perspective view of the top assembly in isolation in the retracted configuration.
Figure 7:
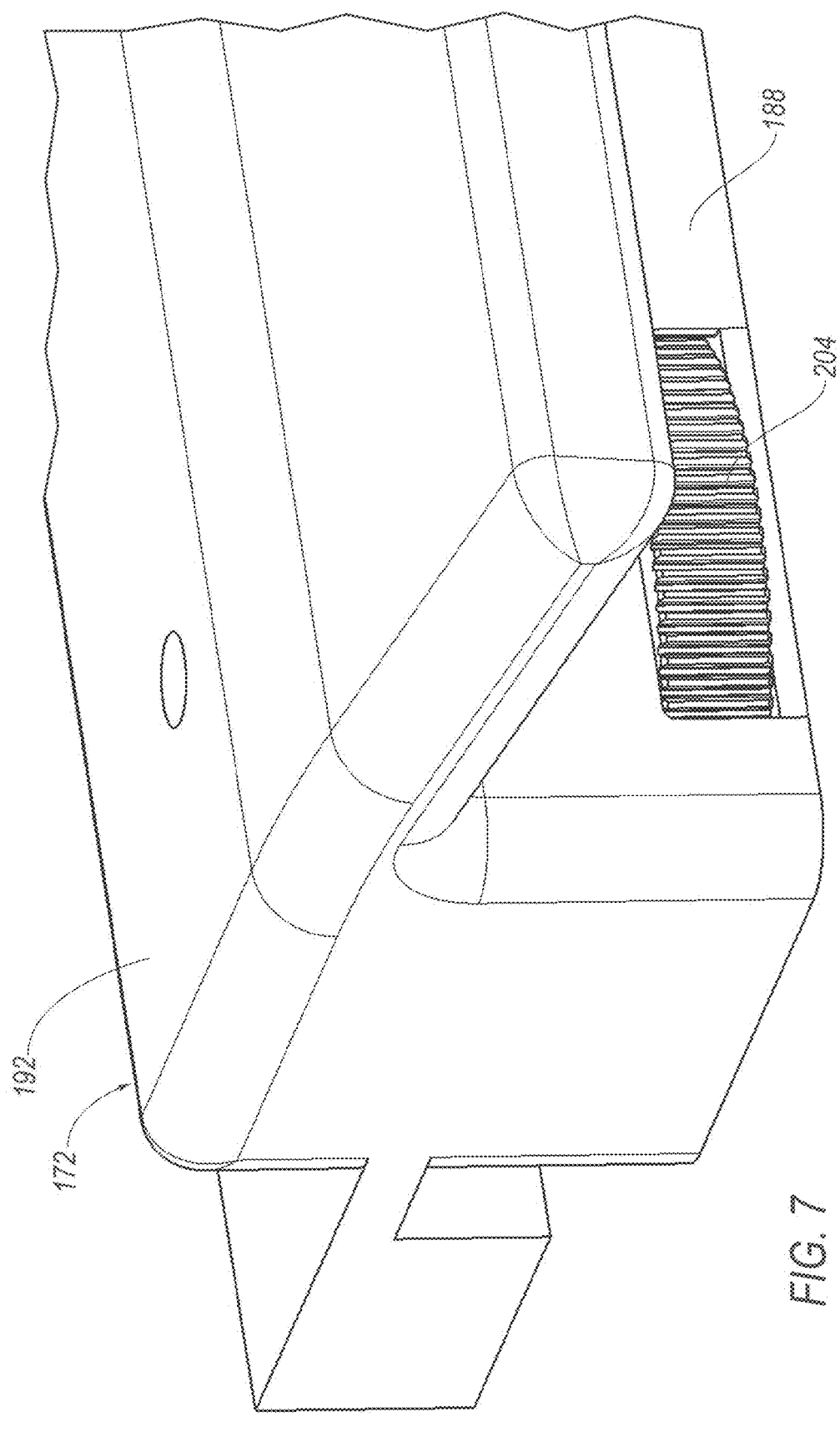
FIG. 7 is a perspective view of a portion of a top carrier of the top assembly containing a top-carrier driver.

With reference to FIG. 5, the top carrier 172 includes an upper section 190, a lower section 192, at least one top-carrier spring 194, at least one spool 178, and at least one top-carrier driver 188 (shown in FIG. 7). The upper section 190 and the lower section 192 are generally rectangularly shaped. The upper section 190 and the lower section 192 are hingedly connected. The upper section 190 and the lower section 192 are rotatable relative to each other about a horizontal, lateral axis defined by the hinged connection. The top-carrier springs 194 connect the upper section 190 and the lower section 192. The spools 178 are mounted to the upper section 190 and rotatable relative to the upper section 190. The top-carrier drivers 188 are mounted to one of the upper section 190 or the lower section 192 (e.g., the lower section 192). The top-carrier drivers 188 are arranged to move the top carrier 172 relative to the front plate 110, as well as to simultaneously rotate the spools 178.

Returning to FIGS. 4A-B, the top carrier 172 is movable relative to the front plate 110 between a retracted position (as shown in FIG. 4A) and an extended position (as shown in FIG. 4B). For example, the front plate 110 may include front-plate tracks 196, and the top carrier 172 may be slidable in the front-plate tracks 196 between the retracted position and the extended position. The front-plate tracks 196 may include lips extending parallel to the front-plate beams 154, and lateral edges of the upper section 190 and lower section 192 of the top carrier 172 may fit within and be slidable along the lips. When the top carrier 172 is in the retracted position, the top carrier 172 is positioned on the front plate 110, and the upper section 190 and the lower section 192 are in the front-plate tracks 196. The upper section 190 and the lower section 192 are thus parallel to the front plate 110. When the top carrier 172 is in the extended position, the top carrier 172 extends from the front plate 110. For example, the lower section 192 is in the front-plate tracks 196, and the upper section 190 is spaced from the front plate 110. The upper section 190 is also angled downward relative to the lower section 192 and the front plate 110 (e.g., aided by the top-carrier springs as described below).

The top-carrier springs 194 connect the upper section 190 and the lower section 192. The top-carrier springs 194 control the relative orientations of the upper section 190 and the lower section 192. The top-carrier springs 194 may be arranged to bias the upper section 190 downward away from being parallel to the front plate 110. For example, the top-carrier springs 194 may be linear extension springs. One end of each top-carrier spring 194 may be fixed to the lower section 192 at a position located above the rest of the lower section 192, and the other end of each top-carrier spring 194 may be fixed to the upper section 190 at a position located below the rest of the upper section 190. The top-carrier springs 194 may be loaded in extension (i.e. stretched longer than a relaxed length), meaning that the top-carrier springs 194 are biased toward compressing. The compression of the top-carrier springs 194 pulls the upper section 190 downward relative to the lower section 192, thereby biasing the upper section 190 away from being parallel with the lower section 192 and the front plate 110. When the top carrier 172 is in the retracted position, the front-plate tracks 196 hold the upper section 190 parallel to the front plate 110. When top carrier 172 moves to the extended position, the upper section 190 becomes free of the front-plate tracks 196, and the bias of the top-carrier springs 194 is able to pull the upper section 190 downward.

The top assembly 124 includes a plurality of the top plates 174. In the example shown in the Figures, the top assembly 124 includes three top plates 174, which will be referred to as a first top plate 174a, a second top plate 174b, and a third top plate 174c. The first top plate 174a is mounted to and positioned on the top carrier 172, and each other top plate 174b-c is mounted to and positioned on a previous one of the top plates 174 (e.g., on the top plate 174 directly below). For example, the second top plate 174b is mounted to and positioned on the first top plate 174a, and the third top plate 174c is mounted to and positioned on the second top plate 174b. The top plates 174 may have generally rectangular shapes. The top plates 174 may have approximately the same dimensions as each other, permitting a compact stacking of the top plates 174.

The first top plate 174a is slidable on the top carrier 172 between a retracted position and an extended position, and the remaining top plates 174 are slidable on the respective top plates 174 below them in the stack between a retracted position and an extended position. In the retracted position, each top plate 174 is on the top plate 174 or top carrier 172 directly below, for example, mostly overlapping (e.g., more than 50% of the area overlapping) with the top plate 174 or top carrier 172 directly below. In the extended position, each top plate 174 is extending from the top plate 174 or top carrier 172 directly below, for example, mostly nonoverlapping (e.g., less than 50% of the area overlapping) with the top plate 174 or top carrier 172 directly below.

As one example, the top carrier 172 includes top-carrier tracks 198 (as shown in FIG. 5), and the first top plate 174*a* is slidable in the top-carrier tracks 198 between the retracted position and the extended position. The remaining top plates 174*b-c* may include top-plate slots 200 (best seen in FIG. 6), which interlock with top-plate pegs 202 in the top plate 174 directly below (or vice versa). For example, the top-plate pegs 202 on the top side of the first top plate 174*a* interlock with the top-plate slots 200 passing through the second top plate 174*b*, and the top-plate pegs 202 on the upward-facing side of the second top plate 174*b* interlock with the top-plate slots 200 passing through the third top plate 174*c*. The top-plate slots 200 may be elongated parallel to the top-carrier tracks 198.

Collectively, the top plates 174 are extendable from a retracted configuration to an extended configuration. In the retracted configuration, each top plate 174 is in the retracted position. The top plates 174 in the retracted configuration are stacked. In the extended configuration, each top plate 174 is in the extended position. In the extended configuration, the first top plate 174*a* extends from the top carrier 172, and each other top plate 174*b-c* extends from a previous one of the top plates 174 (i.e., the top plate 174 directly below).

Figure 6:
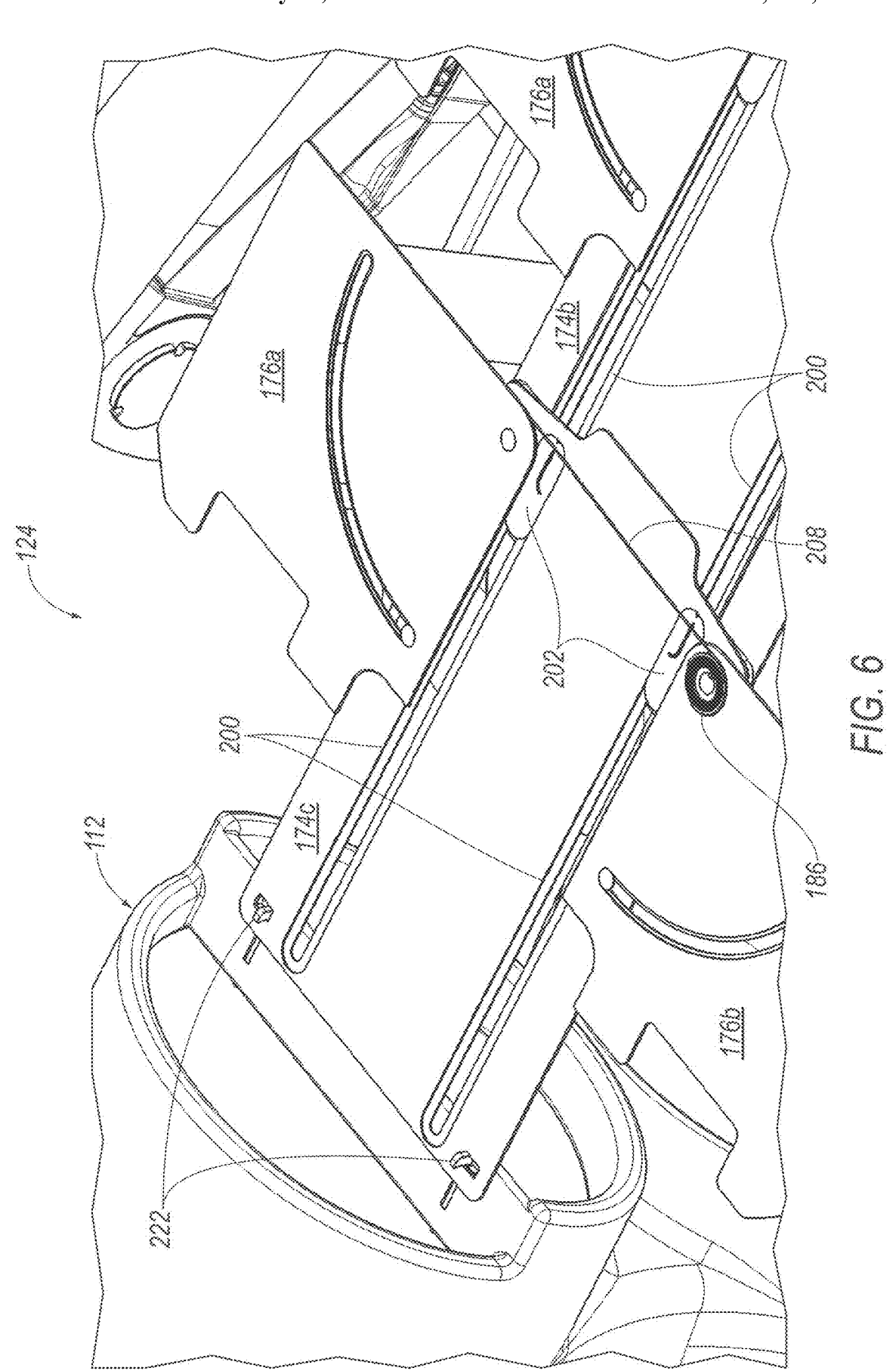
FIG. 6 is a perspective view of a portion of the top assembly attaching to a frame of the open-air vehicle.

With reference to FIG. 6, the top plates 174 in the extended configuration may be attached to the frame 112 of the open-air vehicle 100 behind the cabin 114. For example, the uppermost top plate 174 (e.g., the third top plate 174*c*) may be attached to a tower of the frame 112 that is located behind the cabin 114. The frame 112 may include hooks 222 configured to mate with the third top plate 174*c*. The third top plate 174*c* may include openings positioned to be aligned with the hooks 222 when the top plates 174 are in the extended configuration. The hooks 222 may be deployable. For example, the hooks 222 may rotate into a position that blocks the third top plate 174*c* from lifting away from the frame 112 (e.g., from the surface of the tower of the frame 112).

With reference to FIG. 7, the top-carrier drivers 188 are arranged to drive the top carrier 172 along the front plate 110. For example, the top-carrier drivers 188 may be mounted to the lower section 192 of the top carrier 172. The top-carrier drivers 188 may drive respective driver gears 204. The driver gears 204 may be mounted to the lower section 192. The driver gears 204 may be spur gears. The driver gears 204 engage with respective rack gears 206 fixed to the front plate 110. The rack gears 206 may extend along the front-plate tracks 196 (e.g., one rack gear 206 per lateral edge of the front plate 110, with the rack gears 206 elongated parallel to each other). Each driver gear 204 may engage with a respective one of the rack gears 206. As the driver gears 204 rotate, the driver gears 204 push the lower section 192 along the front-plate tracks 196 from the retracted position to the extended position (or vice versa).

Returning to FIG. 5, one or more spools 178 are mounted to the top carrier 172 (e.g., to the upper section 190). The spools 178 are rotatable relative to the top carrier 172. Ends of the respective spool wires 180 are attached to the spools 178, and the respective spool wires 180 are wound about the spools 178. Unspooling and spooling of the spool wires 180 around the spools 178 controls the extension and retraction of the top plates 174, as described below. The spools 178 may be rotatable by respective spool gears 224. The spool gears 224 for each spool 178 may include a single spur gear or chain of spur gears. The spool gears 224 engage with the respective rack gears 206 of the front plate 110. For example, the spool gears 224 may engage with the same rack gears 206 as the driver gears 204, or each lateral edge of the front plate 110 may include two rack gears 206, one engaged with the driver gear 204 and one engaged with the spool gear 224. As the top carrier 172 moves along the front plate 110, the relative movement of the top carrier 172 with respect to the rack gears 206 rotates the spool gears 224, thereby rotating the spools 178 to spool or unspool the spool wires 180.

Figures 8A, 8B:
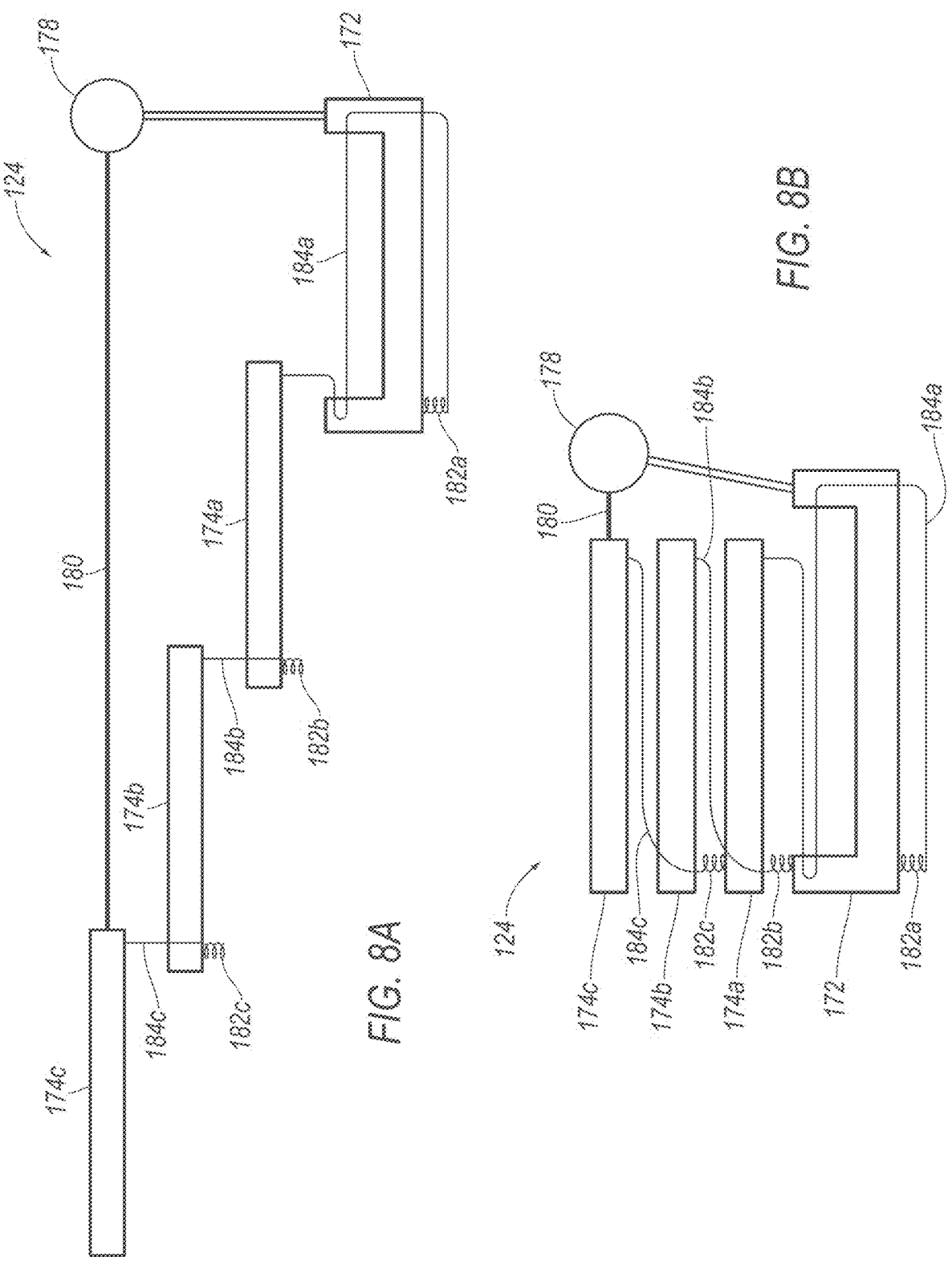
FIG. 8A is a diagram of wire connections for the top assembly in the expanded configuration.
FIG. 8B is a diagram of the wire connections for the top assembly in the retracted configuration.

With reference to FIGS. 8A-B, each spool wire 180 is elongated from one end attached to the respective spool 178 to the other end attached to the uppermost top plate 174 (e.g., the third top plate 174*c*). The unspooled lengths of the spool wires 180 define a maximum distance from the spools 178 to the attachment points of the wires to the third top plate 174*c*. As the spool wires 180 unwind from the spools 178, the maximum distance increases, permitting the top plates 174 to move from the retracted configuration to the extended configuration.

The retraction springs 182 and the retraction wires 184 are arranged to pull the top plates 174 to the expanded configuration. Each retraction wire 184 may be elongated from a first end attached to a respective one of the retraction springs 182 to a second end attached to one of the top plates 174. The first end of each retraction wire 184 may be attached to a respective retraction spring 182 attached to one of the top plates 174, and the second end of each retraction wire 184 may be attached to a next one of the top plates 174 in the stack. In the example of the Figures, a first retraction spring 182*a* is attached to the top carrier 172, and a first retraction wire 184*a* extends from the first retraction spring 182*a* to the first top plate 174*a*; a second retraction spring 182*b* is attached to the first top plate 174*a*, and a second retraction wire 184*b* extends from the second retraction spring 182*b* to the second top plate 174*b*; and a third retraction spring 182*c* is attached to the second top plate 174*b*, and a third retraction wire 184*c* extends from the third retraction spring 182*c* to the third top plate 174*c*. The retraction springs 182 may be attached on the undersides of the respective top carrier 172 and top plates 174. The retraction springs 182 attached to the top plates 174 may be concealed inside the top plates 174. The retraction wires 184 may be arranged so that an unwound length of each retraction wire 184 is shorter when the top plates 174 are in the expanded configuration than when the top plates 174 are in the retracted configuration. For example, the first end of each retraction wire 184 may be attached to a rear end of the top plate 174, the second end may be attached to the respective retraction spring 182 mounted to a forward end of the next top plate. Thus, when the spool wire 180 is unwound, the retraction springs 182 retract the respective retraction wires 184, thereby pulling the top plates 174 from the retracted positions (as shown in FIG. 8B) to the extended positions (shown in FIG. 8A).

Returning to FIG. 4B, the top assembly 124 includes a plurality of the shield plates 176. Two shield plates 176, which will be referred to as a left shield plate 176*a* and a right shield plate 176*b*, may be attached to each of the top carrier 172 and the top plates 174. Thus, in the example with three top plates 174, the top assembly 124 includes a total of eight shield plates 176. The shield plates 176 may have generally rectangular shapes. The shield plates 176 may have approximately the same or slightly smaller dimensions than the respective top plate 174 or top carrier 172, so as to be accommodated on the respective top plate 174 or top carrier 172.

Returning to FIGS. 4B and 5, each shield plate 176 is rotatable relative to the respective top carrier 172 or top plate 174 between an inboard position and an outboard position. The shield plate 176 in the inboard position is on the respective top carrier 172 or top plate 174, for example, mostly overlapping (e.g., more than 50% of the area overlapping) or entirely overlapping with the respective top carrier 172 or top plate 174. The shield plate 176 in the outboard position extends leftward (for the left shield plate 176a) or rightward (for the right shield plate 176b), for example, mostly nonoverlapping (e.g., less than 50% of the area overlapping) with the respective top carrier 172 or top plate 174. The use of the shield plates 176 permits coverage of a laterally wider area than the width of the front plate 110, while the top assembly 124 in the retracted configuration can still be packaged on the front plate 110.

As one example, returning to FIG. 6, each shield plate 176 may be connected to the respective top carrier 172 or top plate 174 by a pin about which the shield plate 176 is rotatable. The pin may be located closer to the lateral edge of the respective top carrier 172 or top plate 174 from which the shield plate 176 extends in the outboard position (left for the left shield plates 176a and right for the right shield plates 176b). The shield-plate springs 186 may connect at least some of the shield plates 176 to the respective top carrier 172 or top plates 174 (e.g., one of each pair of left and right shield plates 176 may be connected by a shield-plate spring 186 to the respective top carrier 172 or top plate 174). Each shield-plate spring 186 may be arranged to bias the connected shield plate 176 toward the outboard position. A shield-plate wire 208 may connect each left shield plate 176a to the respective right shield plate 176b. The shield-plate wire 208 may be arranged to rotate the pair of shield plates 176 in tandem between the inboard positions and the outboard positions. The shield plates 176 may include semicircular slots engaged with pegs extending from the respective top carrier 172 or top plate 174, which can guide the rotation between the inboard and outboard positions. The semicircular slots are centered on the respective pins about which the shield plates 176 are rotatable.

Collectively, the shield plates 176 are movable from a retracted configuration to an extended configuration. In the retracted configuration, each shield plate 176 is in the inboard position. The shield plates 176 in the retracted configuration are stacked on the respective top carrier 172 and top plates 174. In the extended configuration, each shield plate 176 is in the outboard position. In the extended configuration, the left shield plates 176a extend leftward from the respective top carrier 172 and top plates 174, and the right shield plates 176b extend rightward from the respective top carrier 172 and top plates 174. The top assembly 124 is in the retracted configuration when the top plates 174 and the shield plates 176 are in the retracted configurations, and the top assembly 124 is in the expanded configuration when the top plates 174 and the shield plates 176 are in the extended configurations.

Figure 9:
FIG. 9 is a perspective view of a portion of the protection system including cables for retraction.

With reference to FIG. 9, retraction of the top assembly 124 may be manually activatable by the driver. A top cable 210 may be elongated from a first end to a second end. The first end may be accessible in the cabin 114. For example, the first end may be fixed to a top-retraction handle 212 located in the cabin 114 and/or the top cable 210 may be exposed in the cabin 114. The top-retraction handle 212 or the top cable 210 may be accessible to the driver for the driver to pull (e.g., located in front of a steering yoke). The second end may be attached to the top assembly 124 (e.g., the top carrier 172). For example, the lower section 192 may include a top-cable attachment point 214 (as shown in FIG. 5) to which the second end of the top cable 210 is fixed (as shown in FIGS. 4A-B). When the top cable 210 is in tension greater than a preset quantity (e.g., because of force exerted by the driver), the second end of the top cable 210 exerts a force pulling the top assembly 124 to the retracted configuration (e.g., by pulling the top carrier 172 to the retracted position). For example, the top cable 210 may be threaded through the front carrier 108 (like a pulley) so that the top cable 210 extends forward from the top-cable attachment point 214 on the lower section 192. The top cable 210 may be arranged to be at a minimum quantity of tension by default (e.g., when not being pulled). The minimum quantity of tension is below the preset quantity. The minimum quantity of tension keeps the top cable 210 taut and extending straight from the top-cable attachment point 214. For example, a spring (not shown) at the top-retraction handle 212 may be biased to wind the top cable 210.

The driver may cause the top assembly 124 to retract by pulling the top-retraction handle 212 or directly pulling the top cable 210, applying tension to the top cable 210 and thereby pulling the top carrier 172 from the extended position toward the retracted position. The movement of the top carrier 172 from the extended position to the retracted position causes the spools 178 to rotate and wind up the spool wires 180. The retraction of the spool wires 180 retracts the top plates 174. As the top plates 174 move into a stack on the top carrier 172, the edges of the top carrier 172 push the shield plates 176 from the outboard positions to the inboard positions. The top cable 210 is thus able to move the top assembly 124 from the expanded configuration to the retracted configuration.

Retraction of the front-protection assembly 122 may be manually activatable by the driver. A front cable 216 may be elongated from a first end to a second end. The first end may be accessible in the cabin 114. For example, the first end may be fixed to a front-retraction handle 218 located in the cabin 114 and/or the front cable 216 may be exposed in the cabin 114. The front-retraction handle 218 or the front cable 216 may be accessible to the driver for the driver to pull. The second end may be attached to the front-protection assembly 122 (e.g., the front carrier 108). For example, the front carrier 108 may include a front-cable attachment point 220 to which the second end of the front cable 216 is fixed (as shown in FIG. 4A). When the front cable 216 is in tension greater than a preset quantity (e.g., because of force exerted by the driver), the second end of the front cable 216 exerts a force pulling the front-protection assembly 122 toward the retracted configuration (e.g., by pulling the front carrier 108 toward the front position). For example, the front cable 216 may be threaded forward of the front position of the front carrier 108 (like a pulley) so that the front cable 216 extends forward from the front-cable attachment point 220 on the front carrier 108. Pulling the front cable 216 pulls the front carrier 108 to the front position and thereby moves the front-protection assembly 122 from the expanded configuration to the retracted configuration. The front cable 216 may be arranged to be at a minimum quantity of tension by default (e.g., when not being pulled). The minimum quantity of tension is below the preset quantity. The minimum quantity of tension keeps the front cable 216 taut and extending straight from the front-cable attachment point 220. For example, a spring (not shown) at the front-retraction handle 218 may be biased to wind the front cable 216.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The adjectives "first," "second," and "third" are used throughout this document as identifiers and are not intended to signify importance, order, or quantity. Operations, systems, and methods described herein should always be implemented and/or performed in accordance with an applicable owner's/user's manual and/or safety guidelines.

What is claimed is:

1. A protection system for an open-air vehicle, the protection system comprising:

a left track fixed relative to a frame of the open-air vehicle, the left track positioned longitudinally forward of a cabin of the open-air vehicle, the left track elongated longitudinally relative to the open-air vehicle;

a right track fixed relative to the frame, the right track positioned longitudinally forward of the cabin, the right track parallel to the left track;

a front carrier engaged with the left track and the right track, the front carrier slidable along the left track and the right track between a front position and a rear position, the front position being forward of the rear position;

a front plate extending from a lower edge to an upper edge, the front plate rotatable about the front carrier at the lower edge, the front plate movable with the front carrier between an undeployed position and a deployed position, the front plate being in the undeployed position when the front carrier is in the front position, the front plate being in the deployed position when the front carrier is in the rear position, the front plate in the deployed position sloping upward from the front carrier in front of the cabin, the front plate in the undeployed position being more horizontal than in the deployed position; and a U-member hingedly connected to the front plate at the upper edge, the U-member including a left arm elongated rearward from the front plate along a left side of the cabin, the U-member including a right arm elongated rearward from the front plate along a right side of the cabin.

2. The protection system of claim 1, further comprising a left linkage bar and a right linkage bar;

the left linkage bar elongated from a first end to a second end;

the first end of the left linkage bar hingedly connected to an end of the left arm of the U-member;

the second end of the left linkage bar hingedly connected to the frame of the open-air vehicle longitudinally behind the cabin;

the right linkage bar elongated from a first end to a second end;

the first end of the right linkage bar hingedly connected to an end of the right arm of the U-member; and the second end of the right linkage bar hingedly connected to the frame of the open-air vehicle longitudinally behind the cabin.

3. The protection system of claim 2, further comprising a magnetic extension fixed relative to one of the left linkage bar or right linkage bar;

the magnetic extension positioned to magnetically attach to the frame of the open-air vehicle when the front plate is in the deployed position.

4. The protection system of claim 1, further comprising a hood fixed to the front plate;

wherein the hood is positioned to conceal the front plate when the front plate is in the undeployed position.

5. The protection system of claim 1, further comprising a cable elongated from a first end to a second end;

wherein the first end is accessible in the cabin;

the second end is attached to the front carrier; and when the cable is in tension, the second end of the cable exerts a force pulling the front carrier toward the front position.

6. The protection system of claim 1, further comprising a top assembly mounted to the front plate;

the top assembly configured to expand from a retracted configuration to an extended configuration in response to the front plate moving from the undeployed position to the deployed position.

7. The protection system of claim 1, further comprising:

a rotary actuator; and a belt positioned to be driven by the rotary actuator;

wherein the front carrier is fixed to the belt.

8. A protection system for an open-air vehicle, the protection system comprising:

a front plate extending from a lower edge to an upper edge, the front plate movable relative to a frame of the open-air vehicle between an undeployed position and a deployed position, the front plate in the deployed position sloping upward from the lower edge in front of a cabin of the open-air vehicle, the front plate in the undeployed position being more horizontal than in the deployed position; and a top assembly mounted to the front plate, the top assembly configured to slide from a retracted configuration on the front plate to an extended configuration extending from the front plate in response to the front plate moving from the undeployed position to the deployed position.

9. The protection system of claim 8, wherein:

the top assembly includes a top carrier;

the front plate includes front-plate tracks; and the top carrier is slidable in the front-plate tracks from a retracted position on the front plate to an extended position extending from the front plate.

10. The protection system of claim 9, wherein:

the top carrier includes an upper section and a lower section;

the upper section and the lower section are hingedly connected;

when the top carrier is in the retracted position, the upper section and the lower section are in the front-plate tracks; and when the top carrier is in the extended position, the lower section is in the front-plate tracks, and the upper section is spaced from the front plate.

11. The protection system of claim 10, further comprising a top-carrier spring connecting the upper section and the lower section;

wherein the top-carrier spring is arranged to bias the upper section downward from being parallel to the front plate.

12. The protection system of claim 9, wherein:

the top assembly includes a top plate;

the top carrier includes top-carrier tracks; and the top plate is slidable in the top-carrier tracks from a retracted position on the top carrier to an extended position extending from the top carrier.

13. The protection system of claim 12, wherein:

the top plate is a first top plate; and the top assembly includes a second top plate slidable relative to the first top plate from a retracted position on the first top plate to an extended position extending from the first top plate.

14. The protection system of claim 12, wherein:

the top plate is a first top plate;

the top assembly includes a plurality of top plates including the first top plate;

the top plates are extendable from a retracted configuration to an extended configuration;

the top plates in the retracted configuration are stacked; and in the extended configuration, the first top plate extends from the top carrier, and each top plate extends from a previous one of the top plates.

15. The protection system of claim 14, wherein the top plates in the extended configuration are attached to the frame of the open-air vehicle behind the cabin.

16. The protection system of claim 12, wherein:

the top assembly includes a shield plate rotatable relative to the top plate from an inboard position on the top plate to an outboard position extending from the top plate;

the top assembly includes a shield-plate spring connecting the top plate and the shield plate; and the shield-plate spring is arranged to bias the shield plate toward the outboard position.

17. The protection system of claim 16, wherein:

the shield plate is a first shield plate;

the first shield plate in the outboard position extends leftward from the top plate;

the top assembly includes a second shield plate rotatable relative to the top plate from an inboard position on the top plate to an outboard position extending from the top plate; and the second shield plate in the outboard position extends rightward from the top plate.

18. The protection system of claim 9, further comprising a cable elongated from a first end to a second end;

wherein the first end is accessible in the cabin;

the second end is attached to the top carrier; and when the cable is in tension, the second end of the cable exerts a force pulling the top carrier to the retracted position.

19. The protection system of claim 8, further comprising a hood fixed to the front plate;

wherein the hood is positioned to conceal the front plate and the top assembly when the front plate is in the undeployed position and the top assembly is in the retracted configuration.

20. A protection system for an open-air vehicle, the protection system comprising:

a left track fixed relative to a frame of the open-air vehicle, the left track positioned longitudinally forward of a cabin of the open-air vehicle, the left track elongated longitudinally relative to the open-air vehicle;

a right track fixed relative to the frame, the right track positioned longitudinally forward of the cabin, the right track parallel to the left track;

a front carrier engaged with the left track and the right track, the front carrier slidable along the left track and the right track between a front position and a rear position, the front position being forward of the rear position;

a front plate extending from a lower edge to an upper edge, the front plate rotatable about the front carrier at the lower edge, the front plate movable with the front carrier between an undeployed position and a deployed position, the front plate being in the undeployed position when the front carrier is in the front position, the front plate being in the deployed position when the front carrier is in the rear position, the front plate in the deployed position sloping upward from the front carrier in front of the cabin, the front plate in the undeployed position being more horizontal than in the deployed position; and a hood fixed to the front plate, the hood being positioned to conceal the front plate when the front plate is in the undeployed position.

* * * * *